United States Patent [19]

Taylor

[11] Patent Number: 4,991,827
[45] Date of Patent: Feb. 12, 1991

[54] SPRINGS FORMED OF ROPE PRESSURE-SATURATED OR IMPREGNATED WITH BINDER

[75] Inventor: Paul H. Taylor, Grand Island, N.Y.

[73] Assignee: Tayco Developments, Inc., North Tonawanda, N.Y.

[21] Appl. No.: 268,564

[22] Filed: Nov. 1, 1988

Related U.S. Application Data

[60] Division of Ser. No. 928,710, Nov. 10, 1986, abandoned, which is a continuation of Ser. No. 650,668, Sep. 13, 1984, abandoned.

[51] Int. Cl.$^5$ .................................................. F16P 1/52
[52] U.S. Cl. ...................................... 267/149; 267/182
[58] Field of Search ................... 267/47, 103, 140.3, 267/148, 149, 150, 181, 182

[56] References Cited

U.S. PATENT DOCUMENTS

| | | | |
|---|---|---|---|
| 2,322,757 | 6/1943 | Ward | 18/34 |
| 2,323,286 | 6/1943 | Ward | 18/34 |
| 2,375,357 | 5/1945 | Friedman | 18/47.5 |
| 2,600,843 | 6/1952 | Bush | 267/149 |
| 2,812,936 | 11/1957 | Setz . | |
| 2,829,881 | 4/1958 | Morris . | |
| 2,852,424 | 9/1958 | Reinhart et al. | 156/154 |
| 2,854,230 | 9/1958 | Jones et al. . | |
| 2,913,240 | 11/1959 | Mohr . | |
| 2,969,971 | 1/1961 | Nelson . | |
| 3,142,598 | 7/1964 | Rosen | 156/162 |
| 3,219,333 | 11/1965 | Derschmidt et al. . | |
| 3,321,200 | 5/1967 | Polhemus et al. . | |
| 3,360,225 | 12/1967 | Camossi | 267/148 X |
| 3,378,426 | 4/1968 | Medney | 156/430 |
| 3,449,199 | 6/1969 | Mead | 161/47 |
| 3,856,289 | 12/1974 | Steele | 267/154 |
| 3,968,958 | 7/1976 | Huchette et al. | 267/47 |
| 4,260,143 | 4/1981 | Kliger | 267/148 |
| 4,347,287 | 8/1982 | Lewis et al. | 428/378 |
| 4,462,946 | 7/1984 | Goldsworthy | 264/23 |
| 4,473,217 | 9/1984 | Hashimoto | 267/149 |
| 4,565,356 | 1/1986 | Nickel | 267/54 |
| 4,715,589 | 12/1987 | Woerndle | 267/148 |

FOREIGN PATENT DOCUMENTS

| | | | |
|---|---|---|---|
| 223965 | 1/1959 | Australia . | |
| 946005 | 4/1974 | Canada . | |
| 36250 | 3/1977 | Japan | 267/149 |
| 582987 | 12/1946 | United Kingdom | 267/149 |

Primary Examiner—Duane A. Reger
Attorney, Agent, or Firm—Joseph P. Gastel

[57] ABSTRACT

A spring consisting of a rope having a plurality of strands each containing a plurality of monofilaments, and a cured binder which has saturated the rope under pressure to cause it to be self-sustaining in spring form. A method of fabricating a spring including the steps of providing a conventional rope composed of a plurality of monofilaments, saturating the rope under pressure with a binder to form a combined rope and binder, forming the combined rope and binder into a predetermined spring shape, and curing the binder to cause the spring to be self-sustaining in the formed predetermined spring shape. A self-damping spring formed by the foregoing method wherein the rope is of the twisted type, and the amount of damping being dependent on the angularity of the twisting. A spring consisting of a first portion of a rope impregnated with binder to hold the spring in a self-sustaining shape and an untreated second rope portion formed integrally with the first portion.

21 Claims, 6 Drawing Sheets

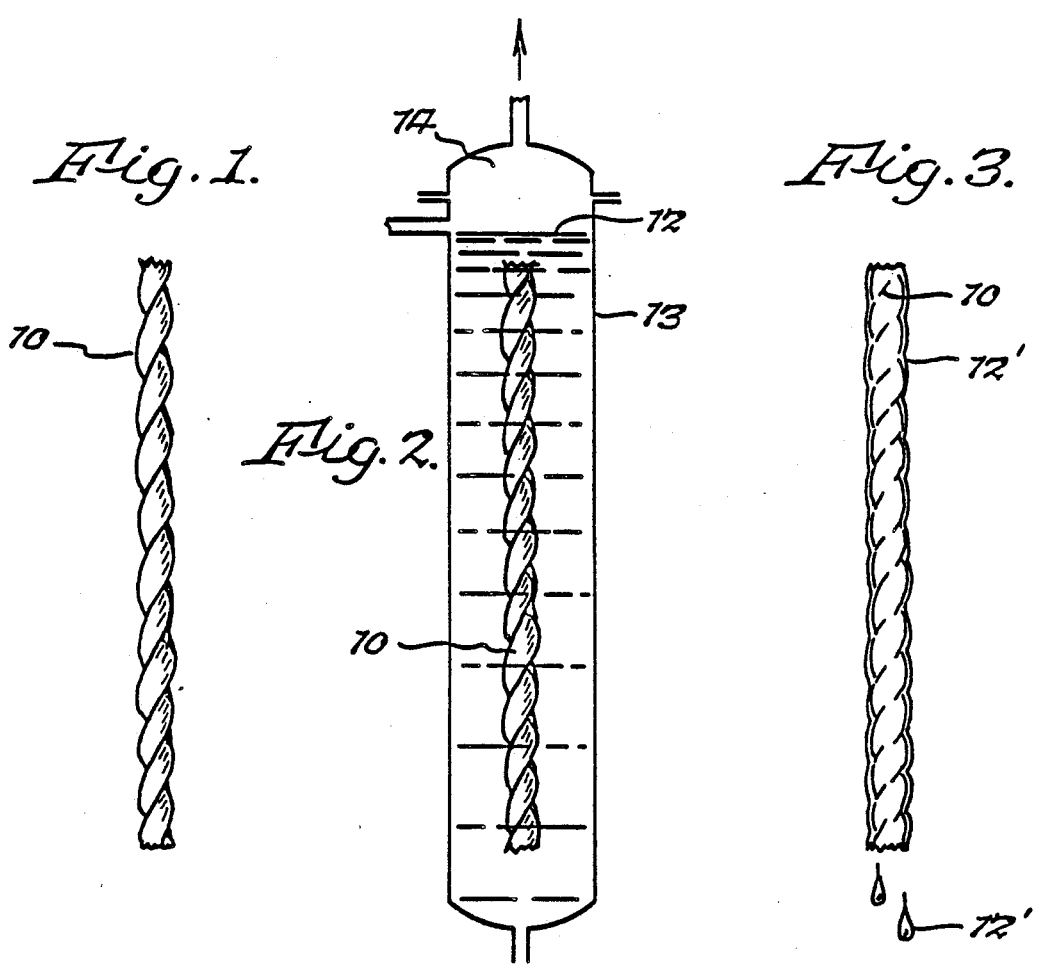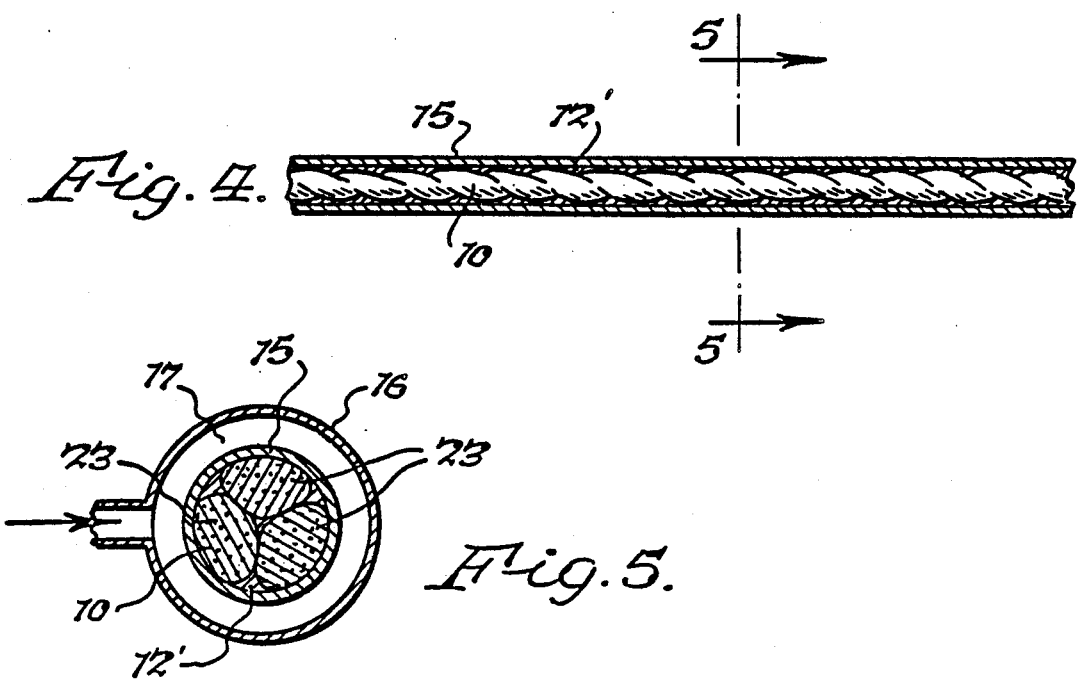

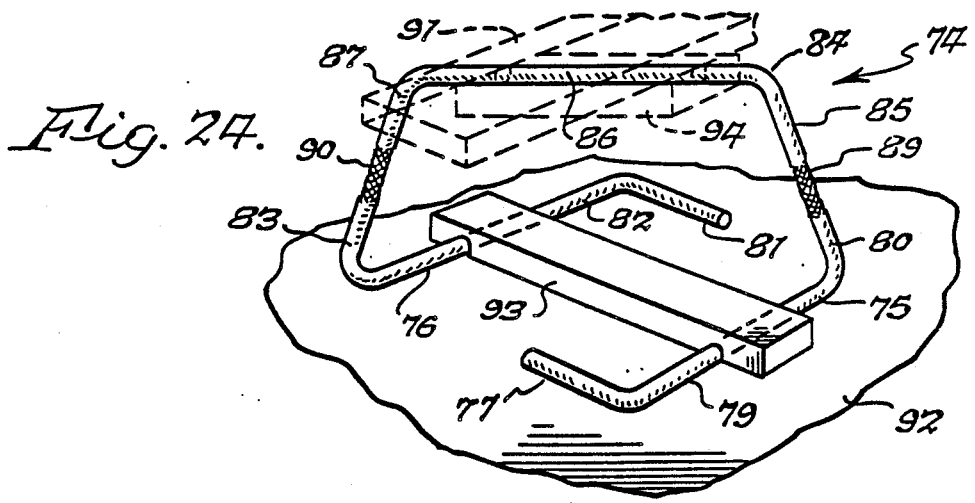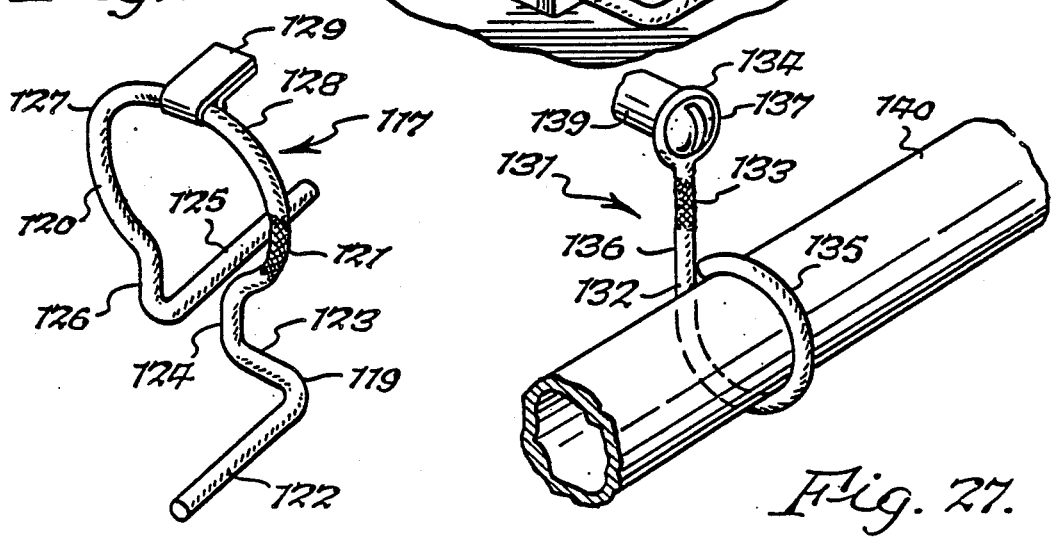

4,991,827

SPRINGS FORMED OF ROPE PRESSURE-SATURATED OR IMPREGNATED WITH BINDER

This is a division of application Ser. No. 928,710, filed Nov. 10, 1986, now abandoned, which is a continuation of application Ser. No. 650,668, filed Sept. 13, 1984, now abandoned.

BACKGROUND OF THE INVENTION

The present invention relates to improved spring structures formed from a conventional rope which has been (1) either impregnated with a binder or (2) saturated with a binder under pressure and to a method of fabrication thereof.

By way of background, plastic springs made of epoxy and reinforced by fibers are known, as disclosed in U.S. Pat. Nos. 2,852,424 and 4,260,143. However, springs of this type relied on the fibers to reinforce the plastic but, insofar as known, the springs were not formed from conventional rope material which was held in spring form by a binder which saturated the rope under pressure. Furthermore, insofar as known, the prior art did not include a teaching of self-damping springs of the foregoing type fabricated from twisted rope. Also, insofar as known, the prior art did not include springs made of rope which included a spring portion impregnated with binder and an untreated rope portion integral therewith.

SUMMARY OF THE INVENTION

It is accordingly one object of the present invention to provide an improved spring which is fabricated from a conventional commercial rope containing monofilaments, with the rope being saturated by a binder under pressure.

Another object of the present invention is to provide a method of fabricating a spring including the step of pressure-saturating a rope with the binder.

Still another object of the present invention is to provide a method of forming a spring unit consisting of a rope having binder-impregnated portions and untreated rope portions.

A further object is to provide an improved spring fabricated of a pressure-saturated commercial twisted rope which is self-damping, with the amount of damping being dependent on the angularity of the twists with respect to the axis of the rope.

Yet another object of the present invention is to provide an improved spring which is formed of rope, part of which consists of rope impregnated with a binder and part of which consists of untreated rope which can be used as a tie or hinge.

Still another object of the present invention is to provide an improved spring support bracket type of device which consists of a binder-impregnated rope portion and an untreated rope portion, the spring bracket being capable of absorbing high and low frequency vibrations. Other objects and attendant advantages of the present invention will readily be perceived hereafter.

The present invention relates to a spring comprising a rope consisting of a plurality of monofilaments, and a cured binder which has saturated said rope under pressure to cause it to be self-sustaining in spring form.

The present invention also relates to a method of fabricating a spring comprising the steps of providing a rope composed of a plurality of monofilaments, saturating said rope with a binder under pressure to form a combined rope and binder, forming said combined rope and binder into a predetermined spring shape, and curing said binder.

The present invention also relates to a spring comprising a rope consisting of a plurality of filaments, and a cured binder impregnating said rope for causing said rope to be self-sustaining in spring form, with said filaments being in twisted form to thereby cause said spring to be self-damping.

The present invention also relates to a spring comprising a rope including first portion means impregnated with a binder and formed into a self-sustaining shape which will provide a spring action, and second portion means of untreated rope formed integrally with said first portion means.

The present invention also relates to a bracket for mounting a body comprising first rope portion means impregnated with a binder to be self-sustaining, and second rope portion means which is untreated with binder and which is formed integrally with said first portion means so as to function as a flexible member and for damping low frequencies.

The various aspects of the present invention will be more fully understood when the following portions of the specification are read in conjunction with the accompanying drawings wherein:

BRIEF DESCRIPTION OF THE DRAWINGS

FIG. 1 is a fragmentary side elevational view of an indeterminate length of rope consisting of twisted strands of high strength monofilaments;

FIG. 2 is a schematic view of the rope of FIG. 1 immersed in a binder contained in a suitable tank to which vacuum is applied;

FIG. 3 is a view similar to FIG. 1 but showing the rope saturated with binder and being drained;

FIG. 4 is a fragmentary cross sectional view of the saturated rope which has been pulled through a suitable tubular sheath;

FIG. 5 is a fragmentary cross sectional view taken in the direction of arrows 5—5 of FIG. 4 and showing the sheathed rope of FIG. 4 located in a pressurizing chamber;

FIG. 24 is a fragmentary perspective view of a spring which may be formed according to the methods of FIGS. 14 or 15 wherein the spring has portions which are impregnated with binder, and other portions which comprise plain untreated rope;

FIG. 25 is a perspective view of another form of spring of the type shown in FIG. 24;

FIG. 26 is a perspective view of another form of spring of the type shown in FIG. 24; and FIG. 27 is still another form of spring of the type shown in FIG. 24.

DESCRIPTION OF THE PREFERRED EMBODIMENTS

Figure 6:
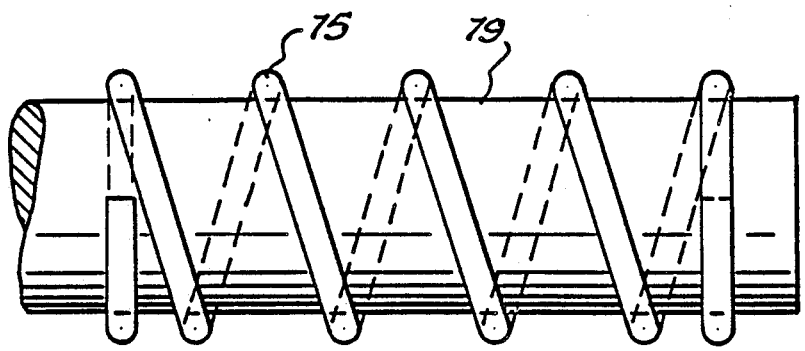
FIG. 6 is a fragmentary side elevational view of a length of sheathed saturated rope wound around a suitable mandrel for imparting a spring shape to the rope.
Figure 7:
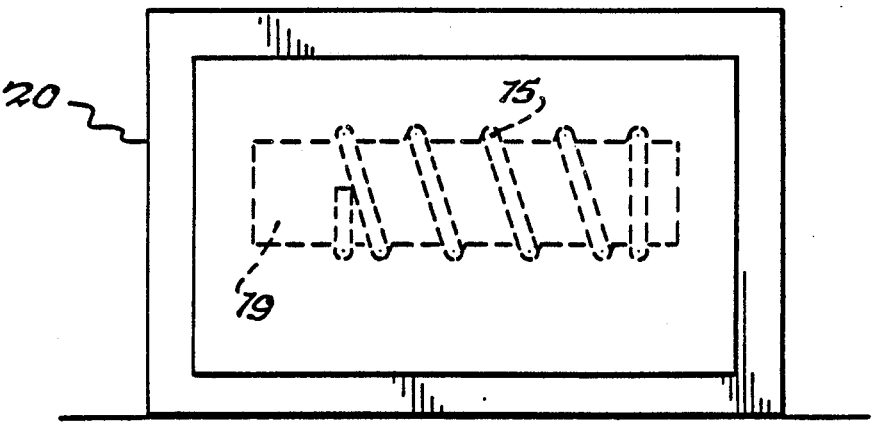
FIG. 7 is a schematic view of the mandrel of FIG. 6 with the wound rope thereon being cured in an oven.

In FIG. 1 is shown an indeterminate length of circular rope 10 of circular cross section. Rope 10 is of any conventional type having high tensile strength. This rope may be twisted, braided or formed in any other suitable manner of a plurality of strands of high strength monofilaments which may comprise, without limitation, such filaments as nylon, DACRON or KEVLAR. Preferably the monofilaments are relatively small in diameter so as to provide high strength to the rope, considering that the monofilament strength generally varies inversely to its diameter and therefore the strength of the rope varies directly with the number of monofilaments up to a certain point. In FIG. 1, by way of example and not of limitation, rope 10 consists of a plurality of twisted strands each containing a plurality of monofilaments (FIG. 5). Further by way of example, rope 10 may preferably be of the readily available type known as precision marine rope.

In accordance with the first step of the process, the rope 10 is combined with a suitable binder to form a combined rope and binder unit 12' (FIG. 3) wherein rope 10 is saturated with a binder 12 under pressure to cause the binder to enter all of the spaces between the monofilaments, as well as to also form a layer on the outer periphery of the rope. In order to combine the binder 12 with the rope to provide substantially complete saturation of the latter, the rope is immersed in a tank 13 containing binder 12. Chamber 14 of the tank 13 is evacuated to produce a reduced pressure in the tank and this will cause the entrained air common in monofilament rope to be withdrawn from between the strands and monofilaments of the rope. Thereafter, the chamber 14 is returned to atmospheric pressure which will cause the binder 11 to be forced into the voids which were previously occupied by air between the strands and monofilaments. Therefore, the foregoing action causes the rope to be pressure-saturated with the binder. If desired, above atmospheric pressure may be applied to chamber 14 to enhance the saturation process. Also, if desired vacuum and pressure may be applied alternately to produce a pumping action. Merely dipping the rope into the binder will not provide the desired degree of saturation which is obtainable by the foregoing procedures.

After the rope 10 has been saturated with binder 12, it is permitted to drain to remove excess binder, as shown in FIG. 3. Thereafter, the drained combined rope and binder 12' is pulled through a suitable tubular sheath 15 which may be fabricated of any suitable flexible material such as nylon, polyvinyl plastic, rubber, TEFLON, or any other suitable material. The flexible tube 15 confines the binder and causes the rope to retain its saturated condition and shape. The tube 15 also permits handling of the saturated rope without the operator being subject to contamination or allergic reaction of toxic binders. The tube can also be used as a diaphragm to which pressure pulses may be applied to enhance saturation. Furthermore, where the spring is to be in abrasive contact with another body, the tube can be made of soft, abrasive-resistant material to protect the other body and also protect the saturated rope from notch failure.

An optional further step in the process is to insert tube 15 containing the pressure-saturated rope 12' into a housing 16 to which high pressure fluid is supplied to the chamber 17 in which the pressure-saturated rope 12' has been inserted. The external pressure thus applied will produce compaction of the rope and binder to increase the ratio of filament to binder to thereby improve the spring strength.

The tube 15 containing pressure-saturated rope 12' is then wound around mandrel 19 (FIG. 6) to the desired helical spring shape. If a flat spring or torsion-bar type of spring is being fabricated, then the spring is formed on a suitable fixture.

The next step in the process is to cure the resin and this may be done by inserting the mandrel 19 with member 15 wound thereon into an oven 20 and curing the binder for the proper time at the proper temperature. If desired, the curing may be effected in a pressurized oven to further ensure that the rope and binder remain compacted and void-free. Since the saturating binder encapsulates each of the monofilaments, each monofilament is held rigidly within the binder matrix. If the tube 15 is made of TEFLON or another type of heat-shrinkable material, the step of curing the binder under heat will also cause further compaction of the saturated rope as the tube shrinks.

Figure 8:
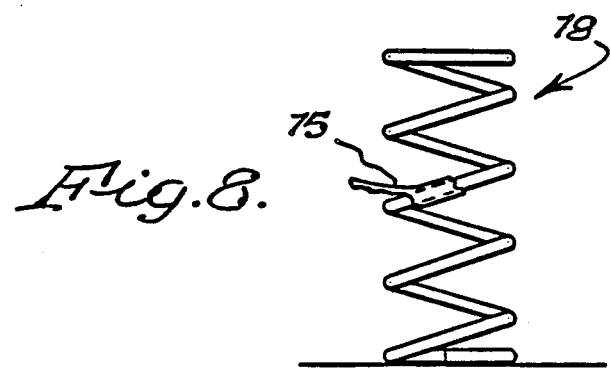
FIG. 8 is a side elevational view of the spring removed from the mandrel with the sheath partially removed from the spring.

The final step in the process is to remove the formed spring 18 shown in FIG. 8 from the mandrel and, if desired, to remove the sheath 15 inasmuch as the spring is now self-sustaining because of the curing process.

As noted above, the preferred monofilament fibers may be nylon, DACRON, KEVLAR or any other suitable fiber which has the desired fatigue and tensile strength and appropriate modulus of elasticity for the maximum energy storage or damping action for the application to which the spring is to be used. The binder 12 is preferably a suitable epoxy resin or suitable thermoplastic which has high strength in tension, compression and fatigue. Other suitable binders may also be used depending on the desired characteristics of the spring. The finished spring depends on the strength of the monofilaments, the binder being primarily for the purpose of holding the monofilaments and spring in the desired self-sustaining shape while also adding a certain amount of strength to the spring.

Figure 9:
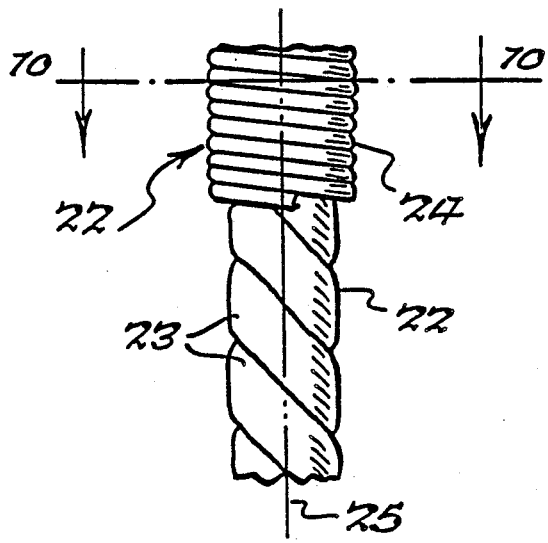
FIG. 9 is a fragmentary side elevational view of an alternate form of rope which can be used to make a spring according to the above-described process.
Figure 10:
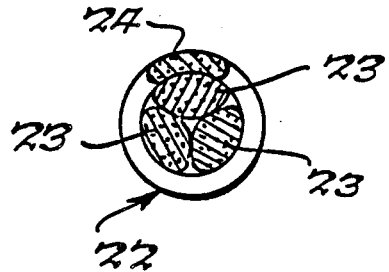
FIG. 10 is a cross sectional view taken substantially along line 10—10 of FIG. 9.

In FIGS. 9 and 10 an alternate embodiment of the type of rope is shown which can be formed into a spring of the type disclosed in FIG. 8 after the rope has been pressure-saturated with a suitable binder in the manner described above relative to FIGS. 1-7. The rope 22 contains three strands 23 which are suitably twisted relative to each other, with each strand containing a plurality of monofilaments of the type discussed in the present specification. Wound around strands 23 is a winding 24 comprising a single strand also containing a plurality of monofilaments. The winding of strand 24 is at a smaller angle to the longitudinal axis 25 than strands 23. In other words, strand 24 extends more nearly perpendicular to longitudinal axis 25 than strands 23. When the spring of FIG. 8 is stressed, the rope 22 will be placed in torsion, as this is a characteristic of a helical spring. The placement of the spring in torsion will be translated to placing both strands 23 and strands 24 into tension. However, since strand 24 is more directly in line with and opposing the torsional forces, it will be better able to resist the torsional forces because monofilaments in strand 24 will be placed into relatively direct tension along their longitudinal axes and thus the tensile strength of the monofilaments will resist the torsion. In contrast to this, the monofilaments in strands 23 extend more transversely to the direction of the torsional forces than strand 24, and therefore while the monofilaments in strands 23 are also placed in tension, they are less able to resist the torsional forces because they are not as much in line with the torsional forces. The sum of the torsional resistances of the monofilaments in strands 23 and 24 constitute the total torsional resistance of the spring, but strand 24 greatly adds to the torsional resistance strands 23 because it extends more in the direction of the torsional forces.

The monofilaments of strand 24 will provide a very high spring force because they are more able to resist the torsion loading of coil springs. However, strands 23 provide a damped spring, as set forth hereafter. This combination therefore provides high spring forces because of strand 24, and moderate spring and damping forces because of more longitudinally oriented strands 23. The configuration is therefore well-suited to a vehicle suspension spring in which the moderate damping would provide a boulevard ride, removing this requirement from the shock absorber, which could therefore be made simpler and cheaper.

Figure 11:
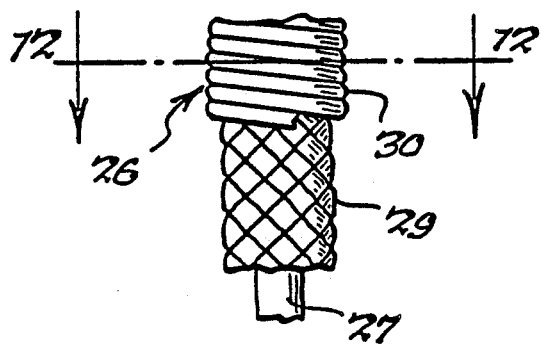
FIG. 11 is a fragmentary side elevational view of another type of rope which can be used to make a spring.
Figure 12:
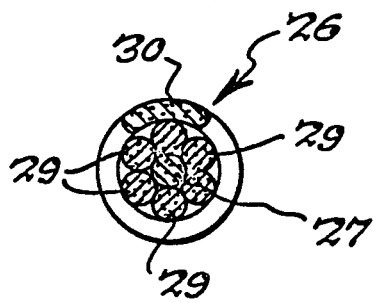
FIG. 12 is a cross sectional view taken substantially along line 12—12 of FIG. 11.

In FIGS. 11 and 12 a further embodiment of the present invention is disclosed wherein rope 26 consists of a central strand 27 bounded by a braided sheath 29. Strands 27 and the strands which comprise braided sheath 29 each comprise a plurality of monofilaments. A strand 30 is helically wound about braided sheath 29, and strand 30 also contains a plurality of monofilaments. A spring is fabricated from the rope of FIGS. 11 and 12 in the manner described above relative to FIGS. 1-7. The strand 30 acts in the same manner as strand 24 of FIGS. 9 and 10, to greatly increase the resistance of the spring to torsion because the monofilaments of strand 30 extend generally in the direction of the torsional forces applied to a spring such as shown in FIG. 8. The spring of FIGS. 11 and 12 will have less damping than the spring of FIGS. 9 and 10, for reasons set forth immediately hereafter.

Figure 13:
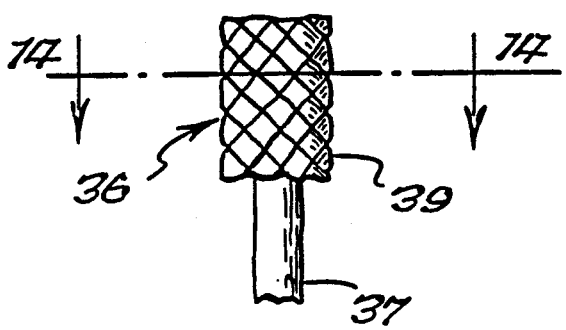
FIG. 13 is a fragmentary side elevational view of a rope of the braided type.
Figure 14:
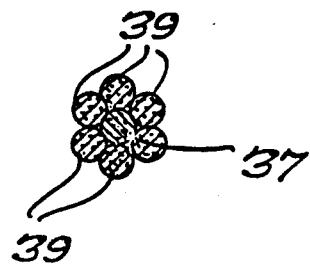
FIG. 14 is a cross sectional view taken substantially along line 14—14 of FIG. 13.

The spring which is formed from the twisted rope of the type shown in FIGS. 1-8 has been found to exhibit a self-damping characteristic as compared to the spring 36 of FIGS. 13 and 14 formed of braided strands 39 of monofilaments. Spring 36 is formed by the same process as the spring 18 of FIGS. 1-8. The only difference between the two springs is that one is formed of twisted strands and the other is formed of braided strands. The self-damping characteristic causes the spring 18 of FIGS. 1-8 formed of twisted rope to have reduced oscillations when subjected to the same loading as the spring 36, and obviously when compared to an analogous metal spring. The amount of damping of a twisted rope spring is directly proportional to the angle of the twist, that is, the more perpendicular the twist to the longitudinal axis of the rope, the more the damping. It is believed that the lesser damping capability of the braided rope of FIGS. 13 and 14 is due to the high lead angle of the filaments, and this causes the spring to have relatively little damping, which makes it better suited to high speed or high energy output requirements.

By way of example and not of limitation, springs have actually been formed from the following. Conventional twisted rope known as precision marine rope was used having an outer diameter of ¼ inch. The rope consisted of nine strands each containing approximately seven monofilaments each having a diameter of approximately 0.006 inches, the monofilaments being of DACRON polyester. The binder was epoxy resin of the type known as a high temperature, low-viscosity cycloaliphaticpolyamine. Other binders of the type described in U.S. Pat. No. 4,260,143 may also be used. The pressure saturation was effected by immersing the rope in the binder and subjecting the binder to a suitable high vacuum, and thereafter returning the binder to atmospheric pressure. The pressure-saturated rope was pulled through a plastic sheath having an internal diameter equal to the outer diameter of the rope. The sheathed saturated rope was cured in an oven at 80° C.-132° C. for four hours. The resulting spring exhibited satisfactory spring characteristics. Springs were also made of ropes of nylon and KEVLAR of sizes of 5/16, ⅜ and ½ inches.

In the spring which was formed as set forth in the foregoing paragraph, the rope comprised 75% of the spring by volume and the binder comprised 25% by volume. By weight, the spring comprised 65% rope and 35% binder.

It is to be noted that the helix of the spring is fabricated in such a direction relative to the direction of the strands that when the spring is stressed, the torsional effect on the spring material places the monofilament fibers in tension.

Figure 15:
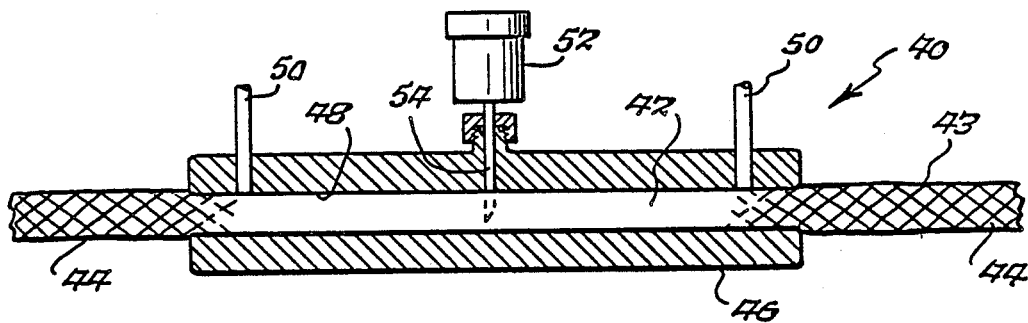
FIG. 15 is a fragmentary schematic cross-sectional view of a device for practicing a method of impregnating only a section of a rope.
Figure 19:
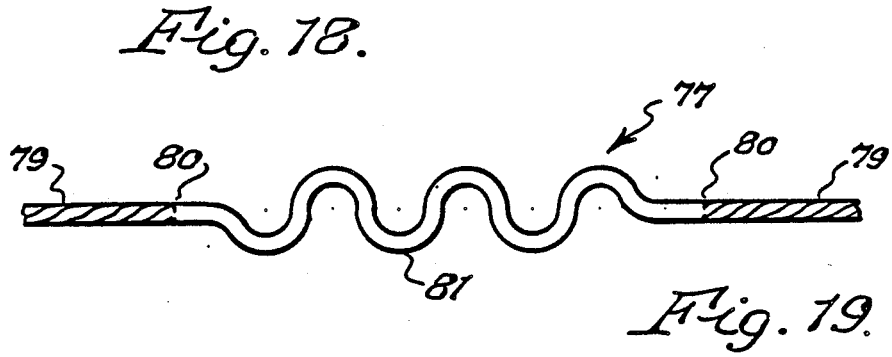
FIG. 19 is a fragmentary plan view of a section of a sinusoidal flat spring which may be fabricated according to the methods of FIGS. 1–8 or FIG. 15.

In FIG. 15 there is a schematic showing of a device 40 and method for saturating only a section 42 of rope 43 while leaving the end portions 44 in their normal unsaturated state so that they can function as ropes (see FIG. 19). Device 40 includes a housing 46 having a bore 48 of lesser diameter than rope 43. Rope 43 is pulled through bore 48 so that it is compressed therein. If desired, housing 46 may be made in two sections. Vacuum tubes 50 draw a vacuum on the portion of rope 42 within housing 46. Simultaneously a measured charge of epoxy or other binder from cartridge 52 is injected into central rope portion 42 by needle 54. The vacuum which is applied through tubes 50 will draw the binder through a portion of rope 42. The foregoing injection process may be carried out to complete saturation for optimum results, or, if desired to have less than complete saturation, the portion 42 of the rope may be impregnated to any desired extent. However, it is preferable that there be complete saturation. The rope 43 which is treated in the foregoing manner is then formed to a suitable shape and cured as discussed above relative to FIGS. 1-8. However, the forming is to any desired shape and not necessarily helical as described above. The manner in which partially treated ropes, such as 43, are formed will be described hereafter.

Figure 16:
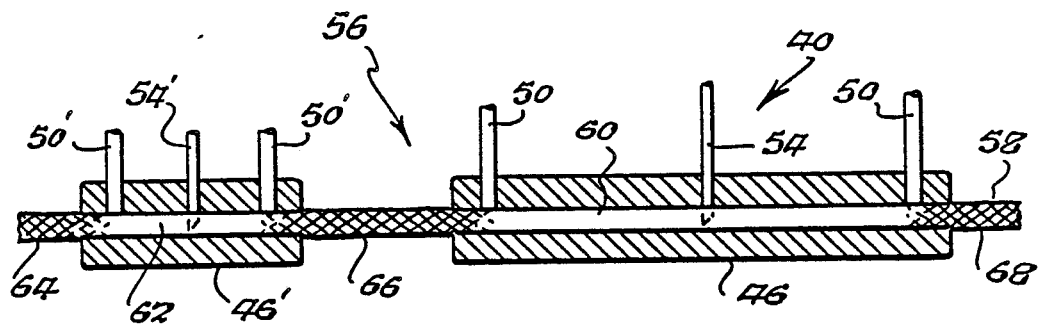
FIG. 16 is a fragmentary schematic cross sectional view of a device for practicing a method of impregnating spaced portions of a rope with different substances.

In FIG. 16 another device 56 and method are schematically shown for treating a rope 58 with different materials at different portions of its length. In this respect, the portion 60 of the rope is treated in a device, such as 46, wherein vacuum is applied through tubes 50 and a suitable binder is applied through a needle 54 as described above. Another device 46' which may be analogous to device 46 has vacuum tubes 50' and a needle 54'. The portion 62 of the rope is injected with another substance, such as NEOPRENE. The portions 64, 66 and 68 of the rope remain untreated. Thereafter, the treated rope 58 is formed to any suitable shape and cured. If desired, the treated portions 62 and 60 of rope 58 may be in immediate abutting relationship with no section of untreated rope therebetween.

Figure 17:
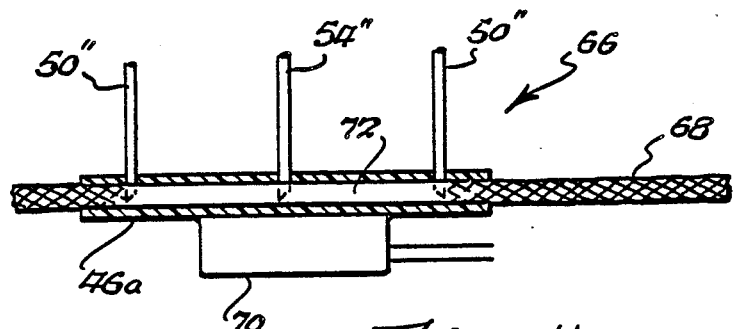
FIG. 17 is a fragmentary cross sectional schematic view of a device for practicing a method of impregnating a sheathed rope with the aid of ultrasonic vibration.

In the embodiment of FIG. 17, rope 68 is located within a tube 46a. The rope 68 may be impregnated within the tube 46a by inserting needles 50" to create a vacuum in the space in rope 68 between the needles and by injecting a suitable binder through needle 54 so that portion 72 between needles 50' becomes impregnated with binder. A suitable vibrator 70, which may be of the ultrasonic type or any other type, is placed against tube 46a to aid in the impregnating process. Alternatively, an ultrasonic vibrator, such as 70, may be spaced a distance from tube 46a. Tube 46a may be a suitable plastic tube of the type described above relative to FIG. 4. Yet another alternate is the use of a microwave element to oscillate the molecular structure of the fibers to assure the desired degree of impregnation while the heat generated cures the binder.

Figure 18:
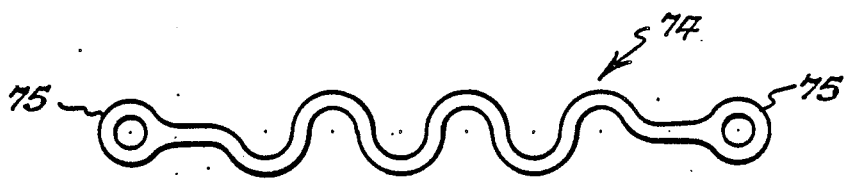
FIG. 18 is a plan view of a sinusoidal flat spring formed according to the method of FIGS. 1–8.

In FIG. 18 a sinusoidal spring 74 is shown which is fabricated according to the method of FIGS. 1-8. The sinusoidal spring is saturated throughout its length and is formed in a suitable die in which it is cured. The ends 75 of the rope are formed into eyelets for receiving suitable pins or screws.

In FIG. 19 a sinusoidal spring 77 is shown which is formed according to the method described above relative to FIG. 15. Spring 77 includes end portions 79 formed of untreated rope of the above-described types. The untreated portions terminate at boundaries 80. The untreated portions 79 may be of any arbitrary length so that these portions can function as ties for attaching the spring to other objects, or the untreated portions can function as hinges. The central portion 81 between boundaries 80 is treated in the manner described above relative to FIG. 15. The central portion 81 is also formed in a suitable die which may hold it during the curing operation. At this juncture it is to be noted that central portion 81 is preferably completely saturated, or if desired, it may be impregnated to any desired extent less than saturation. At this point, it is to be noted that impregnation is defined as containing sufficient binder to cause the spring to be self-sustaining, and that saturated is defined as containing a maximum amount of binder between the strands and monofilaments, and pressure saturation is defined as saturating the rope under pressure.

Figure 20:
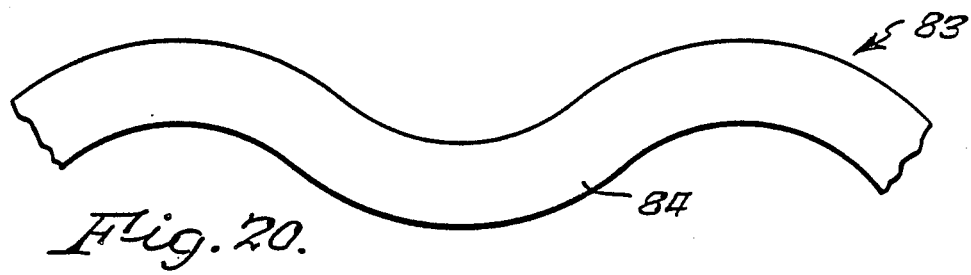
FIG. 20 is a fragmentary plan view of a section of a sinusoidal spring having a shallow curvature which can be pulled to a straight condition without being stressed beyond its elastic limit.
Figure 21:
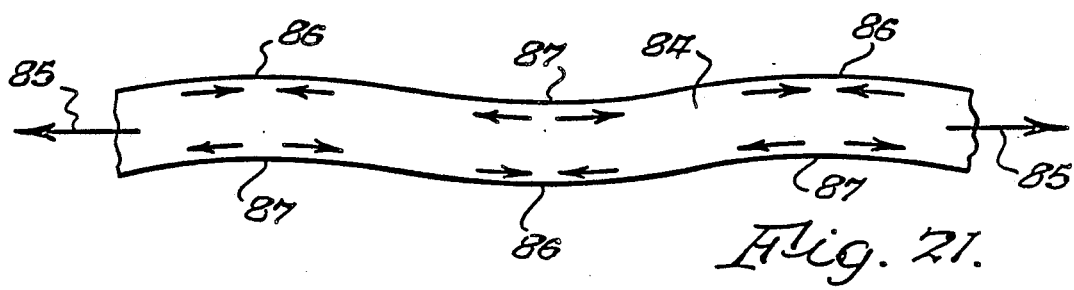
FIG. 21 is a schematic view of the spring of FIG. 20 in a more straightened condition.

In FIG. 20 a section of spring 83 is shown which may be either of the type shown in FIG. 18 or FIG. 19. The central treated portion 84, which contains cured binder which either saturates or impregnates it, is of less curvature than the springs shown in FIGS. 18 and 19. As can be seen from FIG. 21, when forces 85 are applied to the central portion 84, the binder at convex portions 86 is placed in compression and the binder at concave portions 87 is placed in tension. When forces 85 are released, stresses are applied to the binder at areas 86 and 87 to return the spring 83 to its original unstressed form shown in FIG. 20. The characteristic of a spring having a shallow curvature, such as shown in FIG. 20, is that it can be pulled to a straight condition and the forces applied to it will be resisted by the strength of the filaments of the rope itself so that if the forces 85 are greater than the elastic limit of the binder but are not of a magnitude which will stretch the rope, the spring will always return to its original unstressed state when forces 85 are removed.

Figure 22:
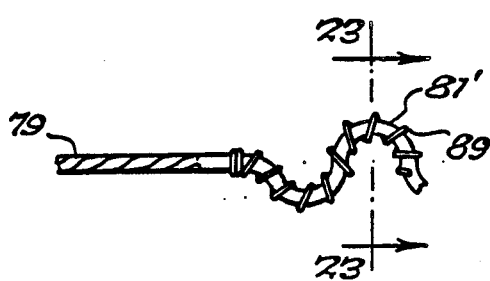
FIG. 22 is a fragmentary plan view of a modified embodiment of the spring of FIG. 19.
Figure 23:
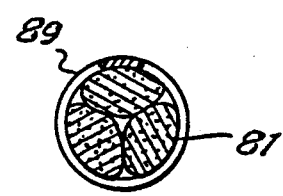
FIG. 23 is a cross sectional view taken substantially along line 23—23 of FIG. 22.

In FIGS. 22 and 23 a modified form of the spring of FIG. 19 is disclosed wherein the treated sinusoidal portion 81' is encircled by a metal coil spring 89 which will act as a conductor to dissipate heat.

In FIGS. 24-27 various forms of springs are disclosed which may be fabricated according to the methods disclosed above relative to FIGS. 15 and 16. Spring 74 includes lower leg portions 75 and 76. Lower leg portion includes portions 77, 79 and 80 which comprise rope which has been impregnated with a suitable binder. Lower portion 76 includes portions 81, 82 and 83 which have been impregnated with a suitable binder. The impregnation can be effected in any suitable manner and preferably by the method set forth above relative to FIG. 15. The spring also includes an upper portion 84 consisting of portions 85, 86 and 87 which are impregnated with a suitable binder. Joining portions 85 and 80 is a segment 89 of rope which has not been impregnated. Joining portions 83 and 87 is a rope portion 90 which also has not been impregnated. The impregnated portions of the spring 74 have normal spring characteristics so that they can flex to absorb forces of a certain magnitude and frequency. However, the portions 89 and 90 which are not impregnated will act as soft columns to absorb high frequency oscillations and other forces. Thus, the impregnated and plain portions of the spring absorb a multitude of forces of different magnitudes and frequencies. In addition, the spring 74 is an insulator so that it electrically insulates the supported body 91 from base 92. A bracket 93 is schematically shown as attaching leg portions 82 and 75 to base 92. Another bracket 94 is shown as attaching spring portion 86 to the underside of body 91. Body 91 may be a chassis of an electronic structure or any other body. The fastenings between bracket 93 and base 92 and between body 91 and bracket 94 have been omitted in the interest of clarity.

In FIG. 25 another form of spring 95 is shown between base 96 and body 97. Spring 95 includes leg portions 99 and 100. Leg portion 99 includes parts 101, 102 and 103. Leg 100 includes portions 104 and 105. Legs 99 and 100 are impregnated with suitable binders or rubber or a combination of both and function as springs as described above. Spring portion 106 includes central portion 107 and outer portions 109 and 110 at opposite ends thereof. Spring portion 106 is also formed of rope impregnated with binder. An untreated portion of rope 111 connects spring portions 100 and 110. An untreated rope portion 112 connects spring portions 99 and 109. Suitable brackets 113 and 114 connect leg portions 101 and 104, respectively, to base 96. A bracket 115 connects the underside of body portion 97 to spring portion 107. The fasteners for brackets 113, 114 and 115 have been omitted in the interest of clarity. As noted above relative to the embodiment of FIG. 24, the impregnated portions 99, 100 and 106 of the spring have normal spring characteristics. The untreated portions 111 and 112 of the spring are ropes which have great flexibility. It can thus be seen that the spring 95 is capable of supporting body 97, which may be an electronic chassis, against forces of low and high magnitude as well as vibrations of both high and low frequency. Untreated rope portions 111 and 112 are in tension, as compared to rope portions 89 and 99 of FIG. 24 being in compression.

In FIG. 26 another form of spring 117 is shown which includes impregnated leg portions 119 and 120 connected by an untreated rope portion 121. The impregnated leg portion 119 includes portions 122, 123 and 124. Leg portion 120 includes portions 125, 126, 127 and 128. It is portions 124 and 128 which are connected by untreated rope portion 121. Leg portions 122 and 125 are intended to be secured to a base and portion 128 is intended to be secured to a body by means of bracket 129. As with the embodiments of FIGS. 24 and 25, the spring of FIG. 26 will support a body against loads of high and low magnitude and high and low frequency.

In FIG. 27 a combined hanger and spring 131 is shown wherein an impregnated portion 132 is connected to an untreated rope portion 133 and an impregnated eyelet 134 is attached to untreated portion 133. Portion 132 includes a circular portion 135 which is connected to a straight portion 136 which is connected to untreated rope 133. A screw 137 connects eyelet 134 to a suitable post 139 which extends outwardly from a wall or the like. The spring 131 is intended to be used as a hanger for pipe 140. It can be seen that rope portion 133 remains flexible and is loaded in tension so that it will permit pipe 140 to swing sideways while the impregnated portions 134 and 135 will resiliently support pipe 140.

Only certain representative configurations have been shown in FIGS. 24–27, but it will be appreciated that springs can be made in any desired form whatsoever and that the present invention is not limited to the forms shown in FIGS. 24–27. The basic underlying characteristic of springs, such as shown in FIGS. 24–27, is that they are a composite of one or more portions of untreated rope and one or more portions which may be saturated or impregnated with a cured binder.

In the embodiments of FIGS. 24–27 the rope functions as an integral part of the spring and acts either as a column in compression (FIGS. 24 and 26) or acts as a link in tension (FIGS. 25 and 27). Furthermore, in FIG. 19, the untreated portion of the rope can act as a member to tie the remainder of the spring to an external body, in which event it acts in tension.

In the embodiments of FIGS. 19, 22 and 24–27, the parts of the spring which contain cured binder may either be formed by a process wherein the binder pressure saturates certain portions of the spring or the binder may merely impregnate these portions of the spring. The pressure saturation is meant to include the complete saturating of the parent rope under pressure, as discussed above, either by applying a vacuum and thereafter subjecting the evacuated rope to pressure, whereas the impregnation of the rope is meant to mean merely placing enough binder into portions of the spring to cause it to be self-sustaining and not necessarily be pressure-saturated. The term "impregnate" is intended to be broader than the term "saturate" in the sense that a rope which is "impregnated" may have any amount of binder up to and including being "saturated." In other words, being "saturated" is a specific embodiment of being "impregnated."

It will further be appreciated that under certain circumstances the ratio of binder to rope in the embodiments of FIGS. 24–27 may be such as to cause the impregnated portions to be substantially rigid, rather than to provide a spring action. In such circumstances, the flexible supporting capability of the brackets shown in these figures will result only from the untreated rope portions.

The embodiments of FIGS. 24–27 may be made in any number of different ways. One way would be to form them in dies which have cavities of the form of the finished spring and to inject binder at select portions of the die while avoiding injection in other portions of the die. Another method could be by forming the springs in a plurality of steps by a plurality of dies which treat different portions of the spring. The dies which are used can also contain heating means for curing the impregnated rope portions. In addition to the foregoing, the impregnated rope portions are preferably encased in tubes, such as shown in FIG. 4. However, with dies in which the binder is injected into the rope, in the manner shown in FIG. 15, a tubular sheath need not be used.

DACRON is a registered trademark for polyester fiber and KEVLAR is a registered trademark for aramid fiber.

While preferred embodiments of the present invention have been disclosed, it will be appreciated that the present invention is not limited thereto but may be otherwise embodied within the scope of the following claims.

What is claimed is:

1. A spring comprising a conventional preformed rope consisting of a plurality of synthetic resinous plastic monofilaments with spaces therebetween, and a cured binder which has saturated said spaces between said filaments of said conventional preformed rope to cause it to be self-sustaining in spring form.

2. A spring as set forth in claim 1 wherein said conventional preformed rope includes a plurality of strands with second spaces therebetween and wherein said cured binder has also penetrated said second spaces.

3. A spring as set forth in claim 1 wherein said conventional preformed rope has a longitudinal axis and includes a plurality of second monofilaments encircling said monofilaments, with said second monofilaments extending in a helical path which is more perpendicular to said longitudinal axis than said monofilaments.

4. A spring as set forth in claim 1 wherein said conventional preformed rope is fabricated from a plurality of twisted strands.

5. A spring as set forth in claim 1 wherein said conventional preformed rope is fabricated from a plurality of braided strands.

6. A spring comprising a conventional preformed rope consisting of a plurality of synthetic resinous plastic filaments with spaces therebetween, a cured binder impregnating said spaces between said filaments of said conventional preformed rope for causing said conventional preformed rope to be self-sustaining in spring form, and said synthetic resinous plastic filaments being in twisted form to thereby cause said spring to be self-damping.

7. A spring as set forth in claim 6, wherein said filaments are monofilaments.

8. A spring comprising a conventional preformed rope consisting of a plurality of plastic filaments with spaces therebetween including a first portion of said rope wherein said spaces are impregnated with a binder and formed into a self-sustaining shape which will provide a spring action, and a second portion of said conventional preformed rope formed integrally with said first portion and being untreated with said binder so as to retain its original rope characteristic.

9. A spring as set forth in claim 8 wherein a single first portion of said rope is located centrally between two second portions which can function as ties.

10. A spring as set forth in claim 8 wherein a single second portion means is located between two first portions.

11. A spring as set forth in claim 8 wherein said spring includes a plurality of first portions and a plurality of second portions.

12. A spring as set forth in claim 8 wherein said first portion is impregnated to the extent that it is saturated.

13. A bracket for mounting a body comprising first conventional preformed rope portion means impregnated with a binder to be self-sustaining, and second conventional preformed rope portion means which is untreated with binder and which is formed integrally with said first portion means so as to function as a flexible member.

14. A bracket as set forth in claim 13 wherein a single second portion means is located between two first portion means.

15. A bracket as set forth in claim 13 wherein said bracket includes a plurality of first portion means and a plurality of second portion means.

16. A bracket as set forth in claim 13 wherein said first portion means is impregnated to the extent that it is pressure saturated.

17. A spring as set forth in claim 1 wherein said synthetic resinous plastic monofilaments are selected from the group of nylon, polyester and aramid fibers.

18. A spring as set forth in claim 1 wherein said synthetic resinous plastic monofilaments have a tensile strength and modulus of elasticity for providing high energy storage.

19. A spring as set forth in claim 6 wherein said synthetic resinous plastic filaments are selected from the group of nylon, polyester and aramid fibers.

20. A spring as set forth in claim 6 wherein said synthetic resinous plastic filaments have a tensile strength and modulus of elasticity for providing high energy storage.

21. A spring as set forth in claim 1 wherein said binder is pressure-saturated into said spaces.

* * * * *

UNITED STATES PATENT AND TRADEMARK OFFICE
CERTIFICATE OF CORRECTION

PATENT NO. : 4,991,827
DATED : February 12, 1991
INVENTOR(S) : Paul H. Taylor

It is certified that error appears in the above-identified patent and that said Letters Patent is hereby corrected as shown below:

Column 11, line 11 (claim 7), after "said" insert
--synthetic resinous plastic--.

Column 11, line 26 (claim 10), after "portion" cancel "means".

Signed and Sealed this

Ninth Day of June, 1992

Attest:

DOUGLAS B. COMER

*Attesting Officer*     Acting Commissioner of Patents and Trademarks